US008825716B2

(12) United States Patent
Martin, Jr. et al.

(10) Patent No.: US 8,825,716 B2
(45) Date of Patent: *Sep. 2, 2014

(54) PROVIDING A MULTI-TENANT KNOWLEDGE NETWORK

(71) Applicant: Cross Commerce Media Inc., New York, NY (US)

(72) Inventors: Russell William Martin, Jr., New York, NY (US); Michael Martinov, Greenwich, CT (US); Heidi Messer, New York, NY (US); Stephen Messer, New York, NY (US)

(73) Assignee: Cross Commerce Media, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/199,631

(22) Filed: Mar. 6, 2014

(65) Prior Publication Data

US 2014/0188557 A1 Jul. 3, 2014

Related U.S. Application Data

(63) Continuation of application No. 13/745,814, filed on Jan. 20, 2013, now Pat. No. 8,713,076.

(60) Provisional application No. 61/589,209, filed on Jan. 20, 2012.

(51) Int. Cl.
*G06F 17/30* (2006.01)
*G06Q 30/02* (2012.01)
*G06Q 50/00* (2012.01)

(52) U.S. Cl.
CPC .......... *G06Q 50/01* (2013.01); *G06F 17/30563* (2013.01); *G06F 17/30569* (2013.01); *G06Q 30/0201* (2013.01)

USPC .......................................................... 707/811

(58) Field of Classification Search
CPC .................................................. G06F 17/30563
USPC .......................................................... 707/811
See application file for complete search history.

(56) References Cited

U.S. PATENT DOCUMENTS

| 8,631,050 B1* | 1/2014 | Gayle | 707/803 |
| 2002/0087386 A1* | 7/2002 | Phillips | 705/10 |

(Continued)

FOREIGN PATENT DOCUMENTS

WO WO 2011/110809 A1 * 9/2011 .............. G06F 17/30

OTHER PUBLICATIONS

"SOA Practitioners' Guide Part 2: SOA Reference Architecture", Surekha Durvasula et al., published Sep. 15, 2006, 52 pages.*

(Continued)

*Primary Examiner* — Rehana Perveen
*Assistant Examiner* — Scott A Waldron
(74) *Attorney, Agent, or Firm* — Troutman Sanders LLP; James M. Bollinger, Esq.

(57) ABSTRACT

Business intelligence, decision support and knowledge management network systems and methods provide efficient, robust, and business-friendly services for the rapid analysis of massive amounts of business, electronic, and other disparate data into actionable intelligence. An advantageous element of the multi-party knowledge network allows the aggregation of common data formats in order to analyze a combined dataset consisting of information from multiple parties, thereby providing additional business intelligence than with a single set of data alone.

12 Claims, 8 Drawing Sheets

(56) References Cited

U.S. PATENT DOCUMENTS

| | | | |
|---|---|---|---|
| 2004/0078423 A1* | 4/2004 | Satyavolu et al. | 709/203 |
| 2005/0043961 A1* | 2/2005 | Torres et al. | 705/1 |
| 2009/0282045 A1* | 11/2009 | Hsieh et al. | 707/9 |
| 2010/0114952 A1* | 5/2010 | Scanlon et al. | 707/770 |
| 2010/0131456 A1* | 5/2010 | Williamson | 707/602 |
| 2011/0145636 A1* | 6/2011 | Schauser et al. | 714/15 |
| 2012/0109947 A1* | 5/2012 | Yu et al. | 707/725 |
| 2013/0179450 A1* | 7/2013 | Chitiveli | 707/737 |

OTHER PUBLICATIONS

Andrew McAfee & Erik Brynjolffson, "Big Data: The Management Revolution", Harvard Business Review, Oct. 2012, pp. 1-6.*

* cited by examiner

PROVIDING A MULTI-TENANT KNOWLEDGE NETWORK

CROSS-REFERENCE TO RELATED APPLICATIONS

This application claims priority to U.S. Non-Provisional patent application Ser. No. 13/745,814, filed Jan. 20, 2013, and sharing the same title, which issued as U.S. Pat. No. 8,713,076 on Apr. 29, 2014. This application also claims the benefit of U.S. Provisional Patent Application No. 61/589,209 filed Jan. 20, 2012, entitled "Systems and Methods for Providing a Multi-Tenant Knowledge Network." In addition, this application is related to U.S. Non-Provisional patent application Ser. No. 13/547,202 filed Jul. 12, 2012 entitled "Advanced Database Systems and Methods." The foregoing patent applications are hereby incorporated by reference into this application in their entireties.

FIELD

The disclosure relates to business intelligence and, in connection therewith, to the provision and use of multi-tenant business intelligence tools across computer networks.

BACKGROUND

As technology continues to advance, more methods of tracking nearly every aspect of a business are developed. Customers' interactions on websites can be tracked. Users' posts to social networks can be viewed. Detailed sales, logistics, and marketing effectiveness data is collected and analyzed. Data sets will continue to grow in size because they are increasingly being gathered by ubiquitous information-sensing mobile devices, remote sensing technologies, software logs, cameras, microphones, radio-frequency identification technology, and a plethora of other sensor networks and tracking systems which exist all around us. In sum, about 90% of the data in the history of the world today was created within the past two years. With the advances in the collection of data hitting the market with such force, businesses are facing the ever-daunting challenge of figuring out how to most effectively use these massive amounts of information to achieve their business goals.

This abundance of data is typically referred to as "big data." In *Big Data: The Management Revolution*, HARVARD BUSINESS REVIEW, October 2012, authors Andrew McAfee and Erik Brynjolfsson consider the impact of big data on companies' performance. For example, it is noted that, as of 2012, 2.5 exabytes of data created each day, and that number is doubling roughly every forty (40) months. In fact, more data cross the internet every second presently than were stored in the entire internet just twenty (20) years ago! Big data takes the form of messages, updates, and images posted to social networks; readings from sensors, GPS signals from cell phones, etc. Given the onset of the big data revolution, it is critical that companies adopt techniques and tools designed to leverage the insights that big data can provide.

Businesses, themselves, typically do not have the capability or capacity to handle this large amount of data. Many companies therefore scale-down available datasets to a more manageable size or use sample sizes and create inelegant methods of managing this remaining information. Many marketing, sales and business managers will use a conventional spreadsheet to manage and visualize data; a tedious process which ignores the power available in full datasets. In order to keep up with the amount of information available to companies, and in order to keep ahead of competition, many of these businesses turn to external vendors in order to manage this unwieldy amount of business data.

Application service providers have grown to play an ever-increasing role in the space of business intelligence. Many Internet companies provide their own reporting tools and advertising platforms or other $3^{rd}$ party technology providers to users of their services in order to keep those users dedicated customers. Applications such as Google Analytics. Epsilon, Doubleclick, LinkShare, and the like allow users to monitor individuals accessing their websites and online media on a highly detailed level. Unfortunately, each of these online services cultivates a "walled garden" of information which creates segmented pockets of data across a set of services. Accordingly, business users traditionally were required to download data from each of these services and aggregate this disparate data on their own. Such a daunting task often led to undesirable or inefficient results.

Over the past few years, information technology companies have rushed to create a market for the analysis of these segmented pools of data. Consulting groups branched out of traditional IT services powerhouses to provide assistance to individual businesses in the collection, storage, and management of their business data. The focus of these consultancies was, and still is, to take off-the-shelf hardware and software in order to create a custom, proprietary solution for each individual business. The prevailing postulate amongst these types of consultants, and the information technology departments working with those consultants, is that business intelligence data is the property of the underlying business and should therefore be both safeguarded and managed on company-owned systems. This conventional thinking creates the unfortunate situation whereby any business, government or other enterprise cannot automate data management to take advantage of economies of scale or insights generated by trusted parties partners other divisions or non-competitive industries around non-proprietary data or useful third party data.

As the market evolved, managed service providers developed which sought to eliminate the need for additional staff and the expensive hardware ownership costs from the equation. These managed service providers would own the requisite hardware, software licenses, and consulting know-how in-house and provide the service of utilization and configuration of a custom business intelligence system for its customers. While this new model reduces complexity to the purchaser of business analytics hardware and software, it merely pushed the previous in-house ownership model to an off-site leased engagement. The business customer's data was still segmented and segregated and there was still a need for custom configuration and management of the business intelligence system by either a trained professional working for the business customer or a consultant provided by the managed service provider. Further, businesses were still constrained to the limits of their custom systems and were presented prohibitively high costs to change or adjust those systems to meet new challenges and business needs as the market evolved. Time is also a consideration as it takes much longer to get answers from a managed service provider.

There exists a need for an improved method of business intelligence, knowledge management and decision support (such terms herein referred to both collectively and interchangeably) wherein the overall cost of ownership and burden of management is further reduced. There further exists a need for a method of better analyzing and collaborating in the business intelligence, knowledge management and decision support field in order to empower decision makers with information to yield creative and desired results.

Other problems and drawbacks also exist. For example, current industry data models cannot support multiple companies, from different verticals (such as banking, retail, pharmaceutical and the like) on a single platform running simultaneously across the same systems and software. These systems were enterprise based—namely designed to support a single organization, typically in one vertical with access only open to a limited number of business users employed by that organization and from within systems housed in the organization's technical infrastructure customization was needed. Thus, an important need remains to permit multiple organizations and their employees, consultants and advisers to access and perform business intelligence on a common pool of data. The inventors created the first multi-tenant, multi-party and multi-enterprise platform (such terms herein referred to both collectively and interchangeably) for business intelligence, covering all of the components of a complete BI solution in a seamless efficient paradigm.

Overview of Illustrative Embodiment

A knowledge network is provided which acts as a social and collaborative platform to create and exchange information, knowledge and insights around data analysis and decision support performed by application software, algorithms or third party analysis offered through an application platform to end users. For example, a consulting company, advertising agency and their client could collaborate around an analysis regarding a specific initiative (e.g., analysis related to launching a new product line) managed by a complicated permissioning system regulating access to portions of data managed by the application system.

Briefly described, a multi-tenant business intelligence system provides an integrated system of computers, databases, data processors, and network-based software that collectively support operative data processing to permit the consolidation, access, and collaboration of disparate data sets in a single business intelligence environment. The multi-tenant business intelligence system includes at least one storage unit, an integration unit, and an analytical processing unit, an application unit and a collaboration unit is preferably, but not essentially, incorporated. The system is advantageously, though not necessarily, adopted for on-line application service provision of business intelligence, and may involve a web-based application accessible from a remote location via another's computer and/or mobile device. The inventive method and computer product program comprise, respectively, steps and commands whereby functions corresponding to the foregoing system components are implemented.

A Unified Information and Storage and Universal Data Model. To enable multi-tenant operations the system's modified data model (UDM) apply for data from multiple companies. This data are optimized to run applications which answer decision support questions. The architecture provides a platform designed to scale with large data sets for multiple customers, and support multiple users running large concurrent queries or requests. To avoid problem, the system limits the amount individual client access to queue up different queries.

The Universal Data Model is an important aspect of this disclosure and provides Business Intelligence, Knowledge Management and decision support as an application service provider (ASP). It is based on a universal taxonomy for numerous industry functions (such as marketing, sales, logistics, HR, finance and the like) each of these individual areas collectively contributing to the resulting taxonomy. This infrastructure allows multiple customers in different industries to break down how they work in each functional area to a set of common components. The universal nature of the taxonomy is what allows the system to work with many different types of customers simultaneously. Common with Charles Darwin's Taxonomy of Species, the system builds a universal vocabulary to classify and extend aspects of different business types into a single model.

The benefits of this kind of a model go far beyond allowing multi-tenant use of the software. By creating a single universal model (and taxonomy) and combining it with the ASP approach, system operation it is possible to group data sets quickly and accurately and it helps within the Enterprise. For example, a retail customer can combine their data sets on revenue growth with a banking customer. Historically this project would have been too difficult as each data set would have been formatted differently, developed by two different modelers, stored in different locations and due to the nature of the businesses being different, the cost of combining would have been out of reach. The Universal Data Model overcomes these difficulties because the two industries are normalized to the Universal Data Model permitting simplified combination for analysis.

Even within industries two similar companies, and even entities in the same company, often use different providers. Prior to the Universal Data Model it would be hard to combine the two sets of data to be analyzed without significant expense or manual compilation. In the absence of the Universal Data Model, multiple providers (such as Salesforce and Siebel, Peoplesoft and Workday, Cheetah Mail and Epsilon) would all appear to have different data definitions and thus analysis across different providers would be difficult to impossible. With the Universal Data Model, data from different providers (and often within the same software providers across different customers) is normalized and the difference from those providers eliminated when the data is loaded into the UDM. This allows for analysis across multiple providers.

The platform includes facilities the group data to the knowledge network, business intelligence and decision support engine. Grouping of data is the ability of more than one company to combine different or similar sets of data that they each have for analysis. An example of this might be two retailers looking to compare how their email campaigns are performing or two divisions in an insurance company looking to compare how news of a disaster is impacting consumer interest in their respective products. Despite potentially different business models, different industries and perhaps different email providers (as the Universal Data Model has normalized all this data), the system can perform unified data analysis by simply gaining permission to allow collective use of the data.

The platform stores and affords access to, and may otherwise maintain (such as by organizing) information relating to one or more interactions, communications, sales, events, campaigns, or other data relevant to the user. The information may be in structured or unstructured form. Structured data embraces many types of data and includes information based on how the data is organized and arranged, as for example, select fields in information storage. Unstructured data is information without meaningful delineations, for example a simple "tweet" from a Twitter user.

In certain aspects of the disclosure, information may be held which is relevant to the user of the system directly or indirectly. For example, direct data may describe the specific performance of the user's organization or public comments about the organization. Indirect data may describe, as an example factors and information relevant to the field of the user's organization, relevant or similar fields, overall economic conditions, socio-political information, and the like.

The integration unit provides for the capture of disparate data in a robust manner from various data sources. In various embodiments, this is carried out so as to yield actionable information in real or nearly real time. For example, the search unit may connect with multiple live data sources and/or multiple customers within data sources and services across the Internet and aggregate those data feeds into a consistent data interpretation format with which a user can consistently evaluate the disparate data, even across diverse applications. Integrated information may come from public, proprietary, and hybrid data sources and may comprise structured and unstructured data formats.

The Analytical processing unit receives information related to integrated data from the database. Based on a request from the user, the analytical processing unit retrieves and filters pertinent information from the information storage in order to produce business intelligence reports and analysis for the user. In various embodiments, the business intelligence reports and analysis is malleable and interactive, such that the user may manipulate, slice, dice, or drill deeper into the proffered analysis through a knowledge network. In some of those embodiments, the analytics unit may provide responses to static or dynamic prompted questions or queries from the user in the form of an actionable decision support system.

The collaboration unit facilitates the sharing and cross-market analysis of information amongst users and organizations. Upon the agreement between users or organizations, the collaboration unit may aggregate integrated data from the collaborative parties and generate a superset of integrated data. This data may include individually owned, public, or both individually owned and public information. In various embodiments, the individual users or organizations may then feed the analytics unit with the superset of data in order to receive more robust business intelligence and data analysis. According to some of those embodiments, collaborative parties may share data for use with the analytics unit while individual proprietary or otherwise private data may remain abstracted or private to the counter collaborative party.

Since all the data exist in the platform and integrated via universal data model, in a universal model, an analysis can be run openly or anonymously. Customers access the system through the User Interface (UI) or API to select the analysis they wish to run and if they do not want to share the data with each other (and limit sharing to the result of an analysis with other customers). An analysis that uses "grouping" can be one customer partnering and bartering for another's data (in exchange perhaps for use of their data), it can be for purchased data (from a data provider like Axciom or other customers of the application platform) or it can be with larger groups of other companies seeking to share a larger pool of salient data with each other to gain greater insights or knowledge. If a customer partners with another customer within the system or multiple customers they can also run the report openly which allows all the partners to see data.

The platform permits access to levels and thus prevents restricted data from being seen at specified levels in violation of either corporate or governmental guidelines. For example PII (personally identifiable information) might be access limited by other companies in a grouped network, allowing use of the data for analysis but never precluding viewing at an individual level.

The application platform supports ASP clients using the Universal Data Model by accessing data for multiple clients from a similar or common source all at once and transforming this data with both other sources of data (third party) as well as proprietary data.

Permissioning: The system permissioning techniques pass "rights" along between users directly and not necessarily through an administrator. If a user is given rights to use and see all or portions of data, they may grant new users (internal or external users) the right to use or see the data while still being overseen by an administrator. This can be in the form of sharing data (via email or other means), grouping data (for analysis) or for viewing in a software or mobile interface. These rights may also be for other software programs to use the data to analyze and improve another technology (for example the data might be analyzed to improve an ad placement or logistics for warehousing).

A side function of this type of permissioning is that a user now has the ability to subscribe to reports that they care about. In the operative system model, a user selects the types of reports/analyses or groups of reports/analyses that they would like to see. Once they select these, the system checks if access rights were granted to the data included or required in the reports or analyses (from other prior granted reports). If new data is required for the report or analysis to run, the system (or administrator) must grant that access to the user. This approach requires the user to determine what they need to do their job.

Sharing is an operation that allows a user to send a report or analysis to another user who may or may not have permission to access the analysis and underlying data. Sharing allows an authorized user to forward pertinent information from system memory to partners, investors and other people that the user feels would benefit from seeing an analysis in the UI embedded link or other method such as Facebook and Twitter. This sharing does not require a user to be a registered with the system. Sharing is an alternative to insecurely emailing documents, such as spreadsheets and also allows users to log communications around a given set of analyses within the system. Sharing is a social application within the software that allows multiple users to interact around the analysis presented through the system.

Presentations is a system application that applies the real time and live function of an analysis and allows the user to organize reports and analyses into a presentation to share or present. This functionally allows the presenter to change or filter reports and analyses in a live presentation. Viewers may also be given a token/password (access code) to allow them access to see and, if the presentation allows, manipulate the report or analysis being presented. The benefit of this is to allow a viewer to explore the data during a presentation, to comment (written or verbal) on an analysis of that data and to add other knowledge that the viewer might have to the presentation.

Third parties, like ad networks, pricing engines, etc. can now provide analyses for free or for a subscription. The system supports the use by third parties including the ability to create algorithms and/or analyses that use the application's UDM and infrastructure to provide results and resell them for a percentage of sale/subscription fees to end users who want to offer access to $3^{rd}$ party providers who are customers of the application platform to end users who want to enhance aspects of their business intelligence. More generally, the system provides a multi-tenant ASP platform with a set of standard and a la carte analyses that can be shared, commented on and stored securely for a broad set of users in multiple organizations.

Some examples of analyses the system can support:

TABLE 1

| | |
|---|---|
| 1 | What day is the best one to run a sale? |
| 2 | How many emails should be sent to generate a positive ROI/Brand Message |
| 3 | What structured (e.g. Newspaper articles) and unstructured (blogs, tweets, facebook posts) information is contributing to website traffic? |
| 4 | What combination of media will yield the highest advertising ROI? |
| 5 | What is the best pricing for products to optimize Revenue/Gross Margins/Net Income? |
| 6 | What elements of my marketing or business partnership are profitable? |
| 7 | What combination of media worked best in the past or will work in the future? |
| 8 | What percentages of revenue were driven by specific channels? |

Commenting: The system also allows users to leave comments or annotate analyses and reports and/or information results and elements. This can be done intra organization but also to shared partners, as well as grouped data partners. Finally the users comments and annotations can also be shown network wide for certain kinds of comments. For example if someone annotates an analysis dealing with consumer confidence that the entire network can see. These can be macro factors or how they see their sales being affected or affecting macro factors.

Discussion boards and chat: Since this is a multi tenant environment with reports and analysis discussion boards and chat are done in ways that are tied to the analysis but also can be done where the discussion can take place and/or be viewed by different organizations based on sharing the access to see or post messages. For example if I am an employee of a financial services company I might post a message tied to a profitability analysis. That message may be seen by internal company employees, partners, consultants, agencies or open to the public network via system memorize access. This includes sharing with business partners current views and how to profit from them. The system also permits posting to the broader network to find other potential people experiencing the same types of issues exposed by the user data. The discussion is all tied around an analysis but also around the network Shared free/paid data: System network will load data from third party providers (like government data, web trends and other sources). The network can take the data in and allow multiple people on the platform to access the data in a shared way. While typically each user would need its own copy of the data, the network platform allows multiple customers to access the data for reporting or analysis purposes. Since that data is only needed once (thanks to the Universal Data Model) it means that one copy of data is all that is needed.

Analysis tools (and store): In addition to the system created analyses for our users, the system has the ability to work with third parties (such as a BCG or McKinsey) who might want to design and build analyses and reports to resell. These analyses and reports would be pre built to the Universal Data Model and then user requests, the analysis is populate the values we started within the network. In addition these third parties may sell services to application platform customers through the network Accordingly, in one aspect, the disclosure is in a system comprising a database for maintaining a structured and unstructured dataset; an integration unit configured to gather intelligence data from disparate data sources and integrated into the structured dataset; an analytics unit configured to retrieve pertinent data from the dataset based on one or more search parameters and to return actionable business intelligence to the user, at least some of the intelligence data being gathered and processed and analyzed in at least near-real time for review by the user.

API to other vendors: System architecture allows third party global vendors (such as ad tech companies) to integrate into the network to use analyses to make automated (machine to machine) decisions. This can be in the form of using an analysis to make rules based decisions or similar. The benefit to a technology vendor is that the universal model allows them to do one integration with the system and avoid having to do integration for similar types of companies (e.g., Siebel versus Salesforce). In this example they could build an analysis that is neutral to the sources of data which can be used to help optimize their technology. There are two different benefits here. The first is to allow a technology company to use a pre-existing analysis (one of the system build in products or from the analysis store) to help make decisions in their technology. The company may want to do this since they do not have all the data from multiple sources cleaned and ready or they may not have the ability to analyze the data.

The second reason may be that they want to write their own way (formula) to analyze or optimize their technology using the data of a customer or groups of customers or others willing to give them access to system data sets (all using system technology). If the technology company writes their own formula they can be given access by their customers to run that formula against data in the system network to get answers back without requiring the customer surrender its data to the technology company or to have them replicate system parameters or analysis. The answer to the analysis would tell them what the software should do next and could be delivered via an API.

Data mining (the automation of data mining processing): In comparison to what is currently being done, where an individual on a desktop machine does data mining via a manual process. The application automates the process of data mining.

These and other objects, features and advantages of the business intelligence system, methods and programs of the disclosure will be elucidated in the following further description including accompanying drawing figures.

BRIEF DESCRIPTION OF THE FIGURES

The purpose and advantages of the present disclosure will be apparent to those of skill in the art from the following detailed description in conjunction with the appended drawings in which like reference characters are used to indicate like elements, and in which.

DETAILED DESCRIPTION OF CERTAIN PREFERRED EMBODIMENTS

Figure 1:
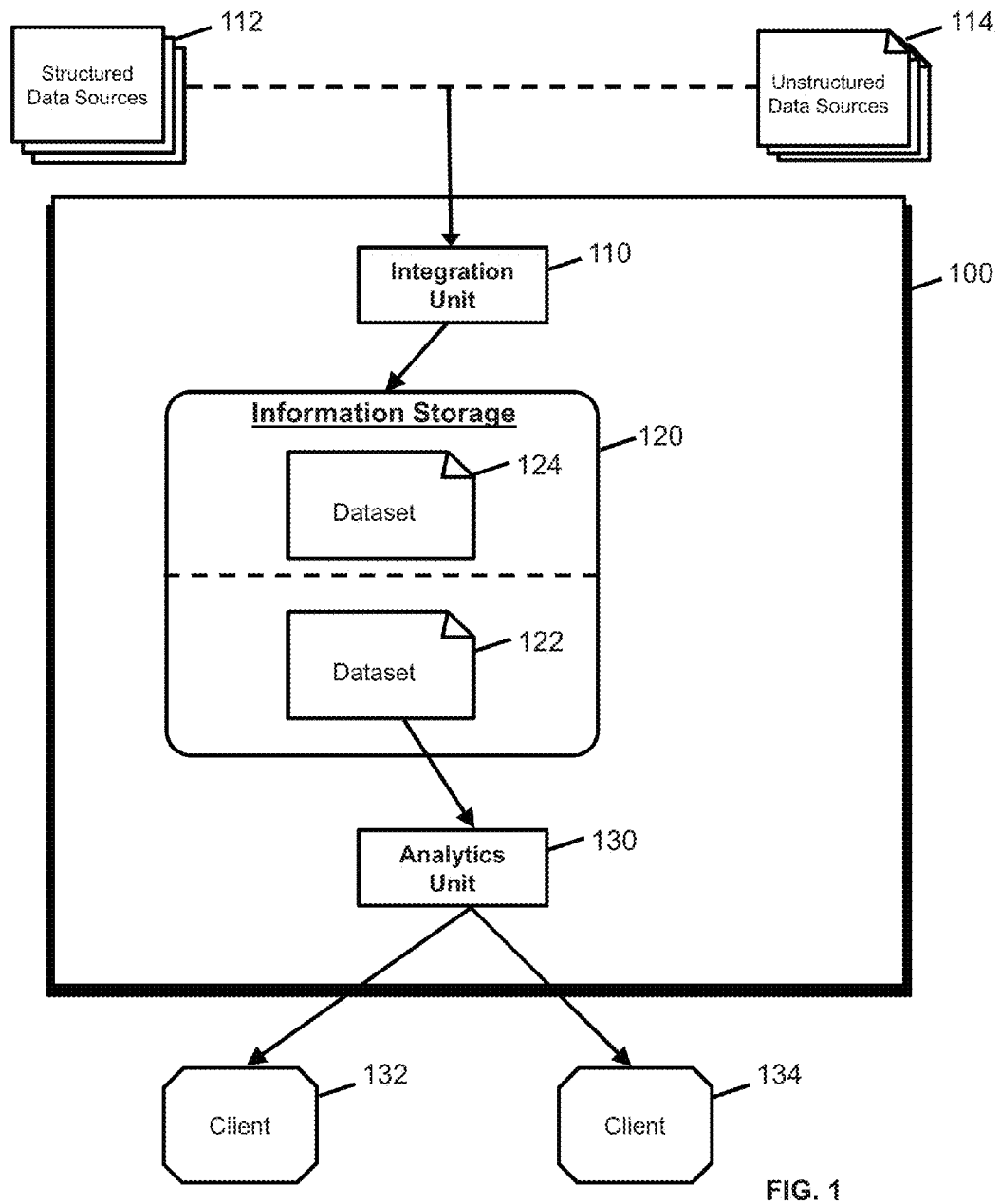
FIG. 1 illustrates a business intelligence system according to an embodiment of the present disclosure.

To facilitate an understanding of the principles and features of the disclosure, various illustrative embodiments are explained hereinafter. Although certain examples of the disclosure are explained in detail, other embodiments are contemplated. Further, in describing the illustrative embodiments, specific terminology will be resorted to for the sake of clarity. It is not intended that the disclosure is limited in its scope to the details of construction and arrangement of components set forth in the following description or illustrated in the drawings. The disclosure has other embodiments and can be practiced or carried out in various other ways as will be understood by one of ordinary skill in the art once in possession of the subject matter herein.

The materials and components described as making up the various elements of the disclosure are intended to be illustrative and not restrictive. Many suitable materials and components that would perform the same or a similar function as the materials and components described herein are intended to be embraced within the scope of the disclosure. Such other materials and components not described herein can include, but are not limited to, for example, those developed after making of this disclosure.

Various embodiments of the disclosure may include instructions executed on a computer. The system as shown in FIG. 1 may be or include a computer system or multiple computer systems. The disclosure may be described in the general context of computer-executable instructions, such as program modules, being executed by a computer. Generally, program modules include routines, programs, objects, components, data structures, etc. that perform particular tasks.

Those skilled in the art will appreciate that the embodiments of the instant disclosure may be practiced with various computer system configurations, including hand-held wireless devices such as mobile phones or PDAs, multiprocessor systems, microprocessor-based or programmable consumer electronics, minicomputers, mainframe computers, and the like. The embodiments of the instant disclosure may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system or platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, unit, or tool. Embodiments of the instant disclosure may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the disclosure. Illustratively, the programming language used may include assembly language, Ada, APL, Basic, C, C++, COBOL, dBase, Forth, FORTRAN, Java, Modula-2, Pascal, Prolog, REXX, Visual Basic, and/or JavaScript for example. Further, it is not necessary that a single type of instruction or programming language be utilized in conjunction with the operation of the system and method of the instant disclosure. Rather, any number of different programming languages may be utilized as is necessary or desirable.

Also, the instructions and/or data used in the practice of embodiments of the disclosure may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed microprocessor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps or the processes of the instant disclosure.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a local or remote user interface that includes input devices such as a keyboard and pointing device, commonly referred to as a mouse, trackball or touch pad. Other input devices may include a microphone, joystick, game pad, satellite dish, scanner, voice recognition device, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the embodiments of the instant disclosure may operate in a networked environment using logical connections to one or more remote computers, the remote computers typically including many or all of the elements described above.

Various networks may be implemented in accordance with embodiments of the disclosure, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the instant disclosure.

More specific embodiments of the present disclosure, in the nature of business intelligence methods and computer program products, are now described for the purpose of providing users with detailed information concerning their available business data to enable informed decisions about how to manage and conduct business. With reference to the figures, in which like reference numerals represent like items throughout the views, various embodiments of the disclosure will be described in detail.

FIG. 1 includes a depiction of business intelligence system 100. The system is robust and features a variety of functions relevant to generating actionable business intelligence for a user. Operation of business intelligence system 100 permits a user to consolidate, access, and analyze disparate sources and types of data in a common data and decision support architecture, from a remote location via the internet or other suitable means of communication, and thus illustrates corresponding steps of the inventive method as well as commands of a computer program product. To this end, business intelligence system 100 performs one or more of the following functions: gather information from disparate data sources; consolidate data in a common data architecture; provide access to consolidated data; search consolidated data based on predefined and user-defined queries and parameters; analyze consolidated date based on predefined and user-defined queries and parameters; combine and compare multiple user datasets in supersets to determine supplemental business intelligence information; present analysis, including supplemental business intelligence information, to users; and provide collaboration capabilities between users and organizations.

As shown in FIG. 1, business intelligence system 100 utilizes an application service provider architecture, in which one or more aspects of the business intelligence system 100 reside within or are otherwise in communication with at least one server. Users access the business intelligence system from any of a plurality of client instrumentalities 132 and 134 remote from the business intelligence system 100. Each client instrumentality 132 and 134 can comprise software, hardware, or a combination of both. In some embodiments, these users may be located at general purpose computers or other networked devices such as cell phones, network appliances, music players, or any other device appreciated by those of ordinary skill that may connect to a network. In some aspects and embodiments of the disclosure, users may connect to a network through individual sub-networks or local networks, or through a plurality of sub-networks or local networks. In some instances, multiple users may be located on one of these sub-networks or local networks. For example, a client device 132 may be a computing device, and a client device 134 may be a process or application running on a mobile device, such as a smart phone or tablet computer.

Business intelligence system 100 comprises at least one information store, such as information storage 120, an integration unit 110, an analytics unit 130, and, in some embodiments, a collaboration unit 140. Generally, information storage 120 holds information populated by integration unit 110 which may come from a wide variety of data sources, such as from structured data source 112 and unstructured data source 114. These data sources may be external or internal to the application service provider of the business intelligence system 100. While information gathered from the variety of data sources may comprise various formats, types, and structures, information resident in information storage 120 is managed in a common data structure. Accordingly, data across information storage 120 can be compared and analyzed in business intelligence system 100 efficiently.

Each of these components of business intelligence system 100 can comprise hardware, software, or a combination of both. Although these components may be described herein as being distinct units, this distinction is provided for illustrative purposes only and should not be deemed to limit the various embodiments of the disclosure. Rather, these components may be combined for dual-use applications, or be overlapping or divided in other ways.

The overall architecture of business intelligence system 100, as shown in FIG. 1, is that of an application service provider architecture. Accordingly, embodiments of the present disclosure contemplate provision of data collection, storage, analysis, and collaboration to occur at a host site operated by the application service provider. In some aspects of the instant disclosure, the ownership or operation of the component parts of the business intelligence system 100 may be managed by a single entity while other embodiments contemplate the system being separated or segmented between multiple entities. The application service provider model may apply to multiple combinations and permutations of computational connections between the devices, modules, units, and other components discussed herein, such that one of ordinary skill in the art may appreciate the various capable embodiments.

In many embodiments, the application service provider model presents a unified system of operation to a user located at a client instrumentality, such as client instrumentality 132. The application service provider model allows the user to connect to the business intelligence system 100 through any known or yet unknown network or data linkage creating a two-way communication between client instrumentality 132 and business intelligence system 100. The connection allows the user to receive or display a user interface from the business intelligence system 100 without the need for the user to own any additional systems or hardware. An advantage to this model is that users of the business intelligence system 100 do not have any start-up costs related to the acquisition or management of hardware or software. An additional advantage of the application service provider model is that all users may simultaneously have new features of the service upgraded across all accounts. Further, as will be discussed in greater detail herein, the storage of all users' data in one central location allows for the analysis of the cross-relevance of user data across organizations and markets to create supplemental business intelligence information.

Returning to FIG. 1, business intelligence system 100 may comprise a database or other form of data warehousing apparatus. Aspects of the disclosure also contemplate a business intelligence system wherein an external database is used, such as a database provided and maintained by a third party and in communication with the business intelligence system. Although the singular form "database" is used throughout this disclosure, it will be understood that one or multiple databases may be used. For example, and not limitation, a common data model may be stored in one database, user data may be stored in another database, data mining models and analytics may be stored in yet another database, and additional metadata created during the implementation and use of embodiments of the disclosure may be contained in still yet another database.

Moreover, the business intelligence system 100 is adapted to analyze, process, and leverage "big data." As known in the art, big data is a collection of data sets so large and complex that it becomes difficult to process using conventional on-hand database management tools or traditional data processing applications. The business intelligence system 100 of FIG. 1 is adapted to manage big data according to the following discussion.

Embodiments of the disclosure contemplate that information storage 120 may comprise one or multiple databases or other form of data store. Regardless, information storage 120 holds datasets for each of the users of business intelligence system 100. In the illustrated embodiment, information storage 120 holds dataset 122 and dataset 124 for two different users of the system, located at client 132 and client 134, respectively. Aspects of the disclosure contemplate a dataset further belonging to an organization made up of a multiplicity of users, wherein the users may share the entire dataset or segment access to an organizational dataset according to a series of organizational data access rules as will be appreciated by those of ordinary skill in the art. Each of the datasets represents a variety of external data sources to which a user or organization has access and has directed to be collected by the business intelligence system 100. The datasets are organized according to a common data structure upon entry into information storage 120 such that disparate data types, such as various forms of structured and unstructured data, may be analyzed and compared against a common series of operators and analysis.

Embodiments of the present disclosure may involve an additional attribute data model to which information in each dataset is based. The attribute data model may exist in the at least one database of the present disclosure or it may exist external to the database or datasets. In such an aspect of the disclosure, the attribute data model will inform the manner and mechanism by which the datasets are created by showing the relationship between dataset elements.

Figure 2:
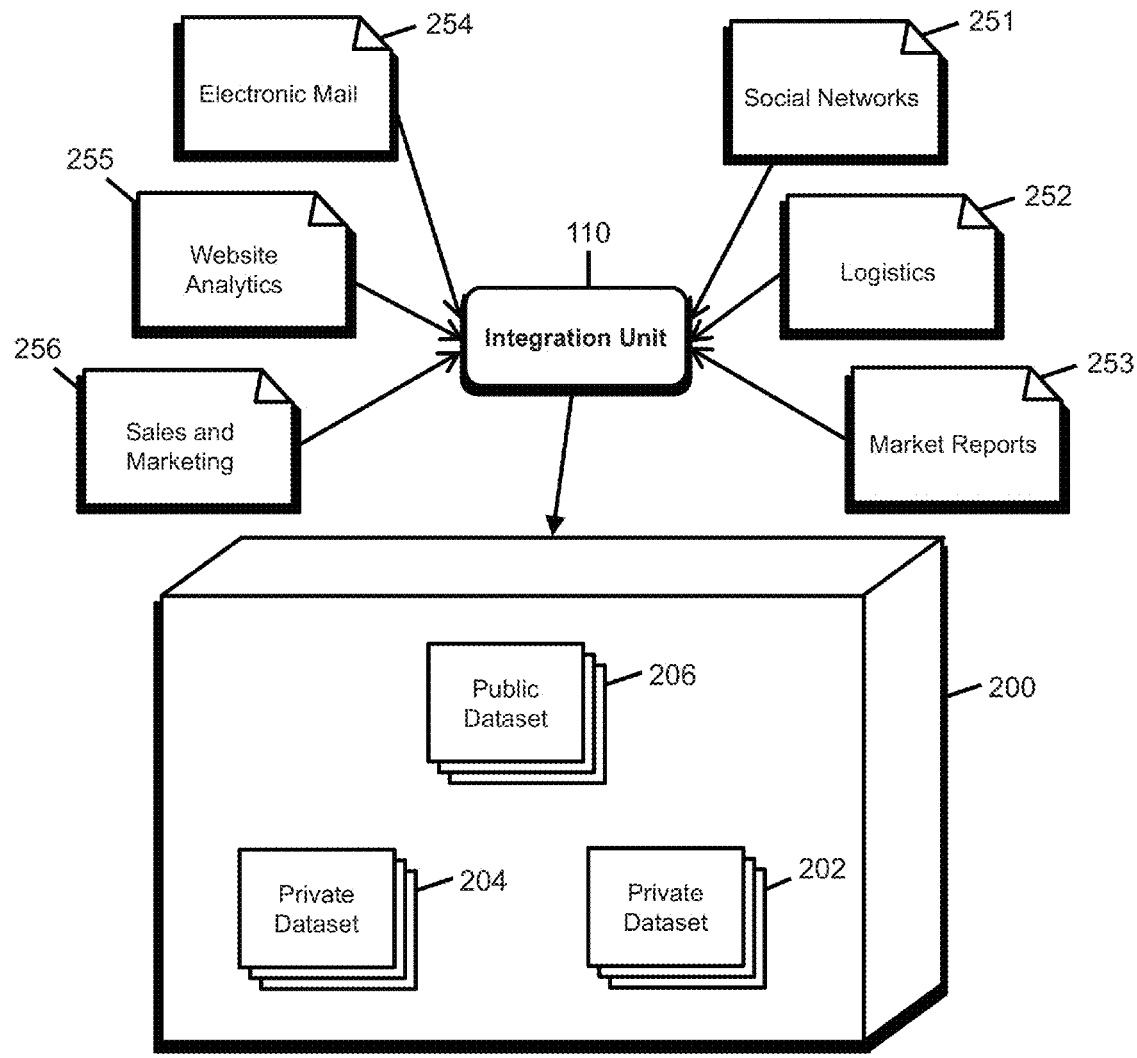
FIG. 2 illustrates a series of data sources as they are integrated into a repository of the business intelligence system according to an embodiment of the present disclosure.

As shown in FIG. 2, alternate embodiments of the present disclosure contemplate the partitioning of a database 200 such that an additional, publicly available dataset 206 may be retained by the database. Publicly available dataset 206 may exist in addition and in supplementation to individual datasets for each of the various users or organizations of the business intelligence system according to the present disclosure. The publicly available dataset 206 may include information available or applicable to all users of a business intelligence system. For example, dataset 206 may include market reports, regional or national news, weather forecasts, stock market information, political information, census data, and the like. As will be understood by one of skill in the art, more than one publicly available dataset 206 may be contained in a single database 200. If more than one publicly available dataset 206 is available, the datasets may be segmented by market, region, age, or any other parameter. In some embodiments of the disclosure, certain publicly available datasets may be available to a greater amount of users of the business intelligence system than other publicly available datasets. In still other embodiments, a user or organization's level of subscription or engagement with the business intelligence system may determine which publicly available information is available to the user or organization.

In the exemplary embodiment of the disclosure, database 200 is comprised of information from a variety of information sources, such as but not limited to electronic mail services 254, website analytics services 255, sales and marketing information systems 256, social networks 251, logistics management systems 252, and market reporting services. These different services may provide application programming interfaces (APIs) allowing the provision of a data connection between these services and an integration unit 110. In other instances, the application service provider of the business intelligence system may have a business relationship with the external information service provider such that data may be provided to the business intelligence system on a custom or exclusive basis. For example, a market research firm may be engaged to provide market reports and analysis to the business intelligence system on a constant or regular basis. As previously described when referring to FIG. 1, the integration unit connects these disparate sources of data to the business intelligence system of the present disclosure.

As described herein, integration unit 110 is configured and programmed to interface with a wide variety of services. When in communication with an external data service, for example the website analytics service 256, integration unit 110 loads a set of data interpretation rules applicable to the particular website analytics service provider. The set of data interpretation rules instruct the integration unit 110 on the proper manner to translate the data feed received from the external data service into an appropriate set of data to be incorporated into database 200. In the example of retrieving information from website analytics service 256, the integration unit 110 would be configured to receive information regarding the historical statistics of website visitors and visitor behaviour over a set period of time. Following the example, the integration unit 110 would then translate the website history data into a format compatible with the dataset of the business intelligence system. The integration unit may also be configured to know which user or organization's dataset is to receive the new or updated information from the external data service. In still further embodiments of the disclosure, it is contemplated that each imported set of external data may be stored in an agnostic fashion such that it can be repurposed in a database of a business intelligence system over time, as organizations and users merge and divide as in the ordinary course of commerce.

It should be noted that the integration unit 110 may be presented with a situation in which the incoming data stream is unstructured, such that it does not contain any metadata identifying the content, type, or format of the data contained in said stream. In these situations, embodiments of the present disclosure contemplate the use of smart logic to parse the data stream and determine the component data types and structures embodied therein, such that the unstructured data may be translated into an appropriate, actionable set of data to be retained in the appropriate dataset in database 200.

In still other aspects of the disclosure, integration unit may be presented with two or more external sources which may supplement one another. In this instance, the integration unit may be configured to aggregate or combine the multiple external data sources into a single data feed which can then be translated into an appropriate, actionable set of data. This aspect of the disclosure may be especially useful when individual external data sources may not provide enough information, alone, to be of use in the business intelligence system of the present disclosure.

Returning to FIG. 1, multiple users may access the business intelligence system 100 via the use of client instrumentalities. In the exemplary embodiment, instrumentalities 132 and 134 are more conventionally known as clients. As described more fully above, clients may be computers, software on computers (such as a web browser), smart phones, tablets, and the like. In one of the preferred embodiments of the disclosure, the client may be a web browser. Client 132 may be in communication with business intelligence system 100 through an interface provided by analytics unit 130. In other aspects of the disclosure, the interface may be an additional or separate component of the business intelligence system 100, situated between client 132 and analytics unit 130. Still other embodiments contemplate other configurations.

Upon receipt of the user interface at client 132, a user may interact with the business intelligence system 100 in order to get insight into any imaginable aspect of the user's organization, business, or overall market. Business intelligence system 100 provides such insight to the user through the operation of analytics unit 130. In various embodiments of the disclosure, analytics unit 130 may identify the specific user or organization represented by the user at client 132. Once identified, the analytics unit 130 may access the user or organization's dataset 122 to perform analysis requested by the user. In certain embodiments of the disclosure, if public datasets are available to the user, the analytics unit 130 may combine the dataset 122 with any other available datasets.

According to aspects of the disclosure, analytics unit 130 is configured to apply any of a series of transformations or analysis on a user's dataset. Accordingly, all of the users of the business intelligence system of the present disclosure are benefited by single-point improvements to the functioning of aspects of the analytics unit. Furthermore, as the analytics unit completes its transformations or analysis on the dataset of the specific user accessing the system, the results of each individual analysis or transformation of data will be different as the dataset underlying such an analysis will differ from user to user or organization to organization. Some of the analysis contemplated by various aspects of the embodiments of the disclosure include, but are not limited to, business performance (such as sales figures, marketing campaign effectiveness, polling numbers, or portfolio performance), goodwill measurement (such as when conducting a social media analysis), comparisons to others in the same or differing markets, and the like.

Since all of the data in user's dataset is of a commonly defined structure, the analytics unit is ambivalent as to the original source of the data. However, other embodiments of the disclosure contemplate the datasets or database retaining information identifying the origin of various external data points in order for the analytics unit or some other component of the business intelligence system to identify the origin of information used in any such analysis. This may be beneficial to a user so that the user may filter out certain external data sources from desired analysis or so that the user (or the business intelligence system itself) may weight external data sources according to preference or historical performance of said data.

Figure 3:
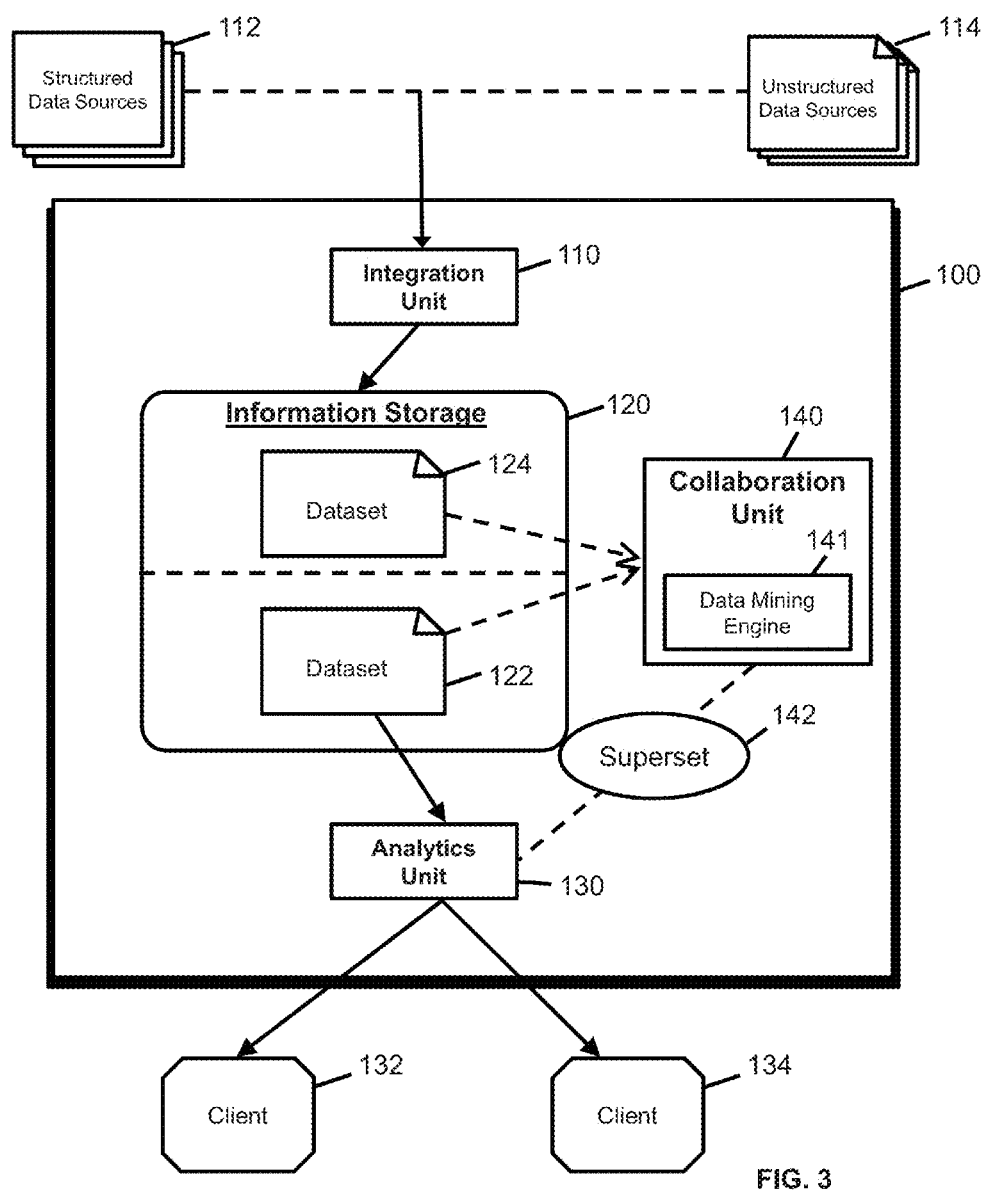
FIG. 3 illustrates a business intelligence system with a collaboration feature according to an embodiment of the present disclosure.

FIG. 3 illustrates embodiments of the disclosure which may be further enhanced by the inclusion of collaboration unit 140 into business intelligence system 100. Collaboration unit 140 may be provided in order to leverage the overall knowledge of the system for individual users or organizations as the system expands. As more users and organizations subscribe to the application service provided by the business intelligence system, more individual user or organization datasets will be gathered in database 100. Increasing numbers of datasets, each of which sharing a common structure and therefore being cross-compatible with every other neighbour dataset, provide for greater opportunities for analysis and aggregation by analytics unit 130.

In certain embodiments of the present disclosure, each individual, non-public dataset is accorded privacy levels at the control of the user or organization to which the dataset belongs. Accordingly, a user may have the option to allow neighbours to access the user's dataset. A user may do this in exchange for access to a corresponding dataset or for other reasons as may be contemplated by those of skill in the art. In certain aspects of the disclosure, a user may be able to access datasets of all other users which have also enabled sharing of datasets. The increasing availability of additional datasets with additional knowledge beyond that of any one individual's data may provide an enticing incentive for the sharing of data across the system.

Various embodiments of the business information system contemplate different methods of utilizing neighbour datasets during the processing of analytics unit 130. In certain aspects of the disclosure, neighbour data may be combined with the same level of relevance or weighting as the user's data. Other aspects contemplate the relative weighting or other influence of neighbour data based on factors such as, but not limited to, historical predictability, market relativity, correlation, and the like. For example, a user accessing business intelligence system 100 through client 132 may be the owner of dataset 122 and have access to neighbour dataset 124. Collaboration unit 140 may aggregate datasets 122 and 124 into a superset 142, which it passes on to analytics unit 130 for analysis as described above. Other embodiments of the disclosure may contemplate the collaboration unit being a part of the analytics unit, or a collaboration unit working independently of the analytics unit in order to process data and present actionable analysis to a user. Those of skill in the art will recognize that more than two datasets may be combined to create a superset, and that a multiplicity of neighbour datasets as well as publicly available datasets may be combined to form a superset as described herein and as contemplated by the many embodiments of the disclosure.

In certain situations, combined datasets may not relate to the same type of underlying entity. Data mining engine 141 compensates for the varying forms and relevancy of neighbour datasets by conducting a cross-market relevancy analysis on combinations of data in the business intelligence system. In the exemplary embodiment of FIG. 3, data mining engine 141 is a component of collaboration unit 140. Other embodiments of the present disclosure contemplate the data mining engine residing as a component of analytics unit 130 or as residing as a separate component in the system. Data mining engine 141 may operate in real-time or may act as a background process, wherein it may analyze incoming data to determine cross-market relevancy such that those calculations and analysis may be available at runtime of a specific query. Cross-market relevancy, as well as other relevancy analysis across types of foreign data, may be determined by an evaluation of the correlation of components of neighbour datasets. For example, decreasing performance (or negative performance) in a dataset concerning financial services may be indicia of reduced spending on luxury goods in upcoming months.

Figure 4:
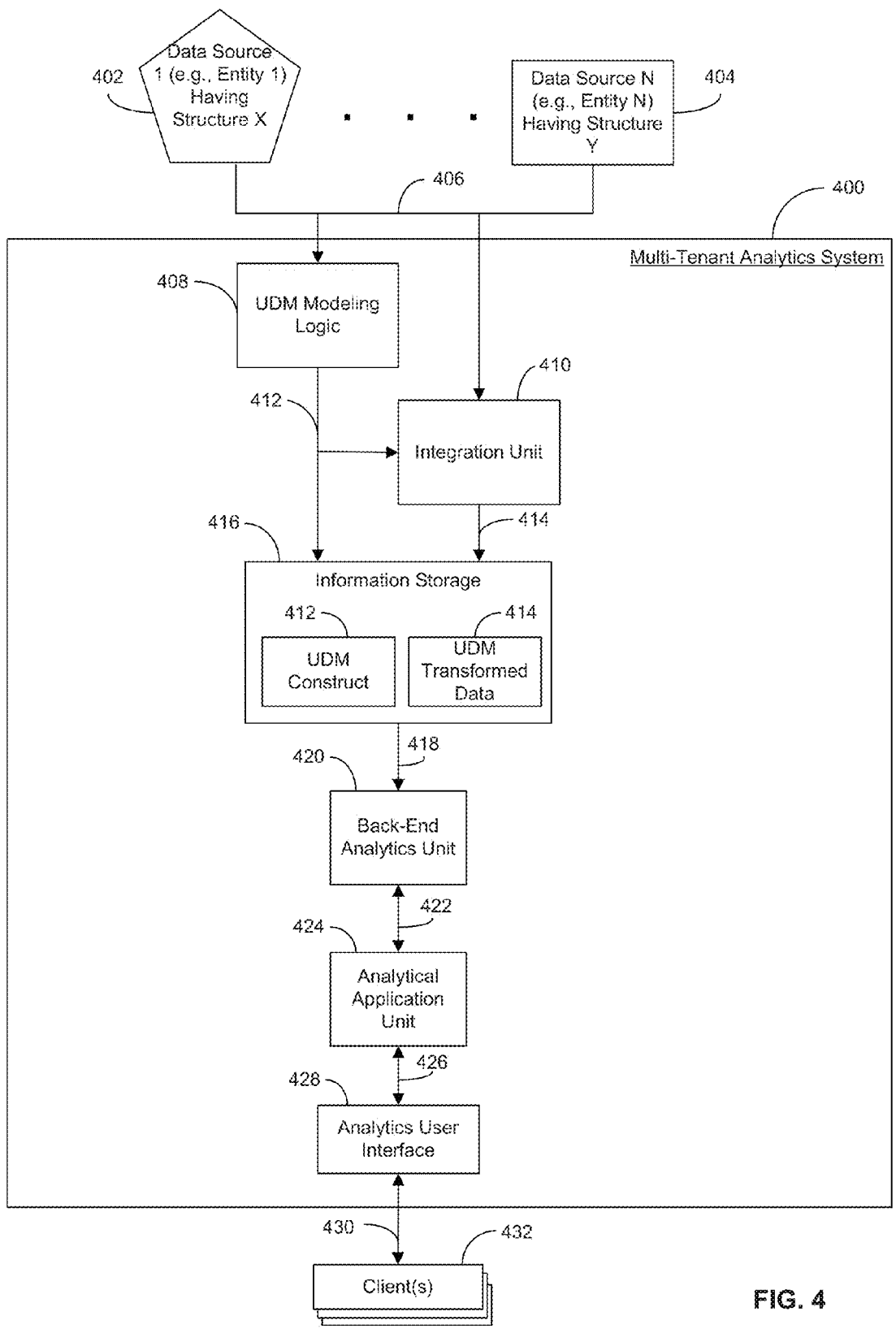
FIG. 4 illustrates a multi-tenant analytics system according to an embodiment of the present disclosure.

Referring now to FIG. 4, another embodiment of the business intelligence system is shown. In the embodiment shown in FIG. 4, the business intelligence system is referred to as a "multi-tenant analytics system" 400. The multi-tenant analytics system 400 includes Universal Data Model (UDM) formatting logic 408, an integration unit 410, information storage 416, a back-end analytics unit 420, an analytical application unit 424, and an analytics user interface 428.

In operation, the UDM modeling logic 408 and the integration unit 410 of the multi-tenant analytics system 400 are configured to obtain raw data 406 from one or more disparate data sources, such as data source 1 401 and data source N 404. As used herein, "raw data" 406 includes data that (i) is not optimized for analytical processing and (ii) does not conform to the UDM construct 412 described herein. As used herein, "obtaining" may include (i) receiving the raw data 406 that is pushed to the multi-tenant analytics system 400 by the data sources; (ii) pulling, or retrieving, the raw data 406 from the data sources by the multi-tenant analytics system 400; or (iii) some combination of receiving pushed raw data 406 from at least one data source (e.g., data source 1 402) and pulling raw data 406 from at least one data source (e.g., data source N 404).

Furthermore, each respective data source may provide data from a different entity, or from different units within a single entity. For example, data source 1 402 may provide data from a first entity (e.g., Company A) while data source N 404 may provide data from a second, different entity (e.g., Company B). In another example, data source 1 402 may provide data from a first unit of a particular entity (e.g., the marketing unit of Company A) while data source N 404 may provide data from a second, different unit of the same entity (e.g., the accounting unit of Company A). The number of actual data sources connected to the system 400 is the number of "tenants" in the multi-tenant analytics system 400. Further still, while only two data sources are shown, those having ordinary skill in the art will appreciate that the raw data 406 may be obtained from any suitable number of different data sources as desired.

Additionally, the raw data 406 may include (i) different types of data having different data values and (ii) different types of data having different data structures (including structured or unstructured, as discussed above). For example, the raw data 406 that is obtained from data source 1 402 may have a particular structure "X," while the raw data that is obtained from data source N 404 may have a different data structure "Y." The UDM modeling logic 408 is configured to generate a particular UDM construct 412 based upon the raw data 406 and/or one or more intended applications of the multi-tenant analytics system 400. For example, in one embodiment, the UDM modeling logic 408 is configured to generate a specific UDM construct 412 (i.e., a particular structure/architecture that incoming data should be conformed to) based upon the different data structures represented in the incoming raw data 406. In this manner, the UDM modeling logic 408 may generate different types of UDM constructs based upon the different structures of data included as part of the raw data 406 and/or based upon particular applications of the multi-tenant analytics system 400.

The integration unit 410 performs extraction, transformation (e.g., cleansing, reformatting, standardization, aggregation, disaggregation, application of business rules, data validation, etc.), and load (ETL) processing (collectively, "integration") on the raw data 406 based on the UDM construct 412 generated by the UDM modeling logic 408. Stated another way, the integration unit is operative to process the incoming raw data 406 in such a manner that the raw data 406 is conformed to the UDM construct 412 generated by the UDM modeling logic 408. Techniques for performing ETL processing are well-known to those having ordinary skill in the art. In addition, the integration unit 410 is further operative to perform the functionality described with regard to the integration unit 110, discussed above with regard to FIGS. 1-3. Upon performing ETL processing on the raw data 406 and conforming the raw data 406 to the UDM construct 412, the integration unit is configured to generate UDM transformed data 414, which may be loaded into an information storage unit 416.

Information storage unit 416 may be implemented in accordance with the discussion of information storage 120 described above. Importantly, the information storage 416 includes the UDM construct 412 and the UDM transformed data 414. In one embodiment, the information storage 416 is configured to further process the UDM transformed data 414 to provide pre-processed UDM transformed data 418. For example, the information storage 416 may include logic operative to perform operations such as query optimization, compression, request parallelization, multi-level data clustering and partitioning, indexing, sorting, aggregating, etc. on the UDM transformed data 414 so as to generate the pre-processed UDM transformed data 418.

The back-end analytics unit 420 is configured to obtain the pre-processed UDM transformed data 418 from the information storage 416 for further analytical processing. In particular, the back-end analytics unit 420 is operative to perform computations related to analytical multi-dimensional processing, data mining, and advanced and predictive analysis processing. For example, the back-end analytics unit 420 is configured to enable a user (e.g., client(s) 430) to obtain answers to questions on a UDM construct 412 (e.g., where the data corresponding to the UDM construct 412 is stored in a relational database, object-oriented database, etc.). A user's queries are answered fast enough to allow interactive exploration of data. Thus, the back-end analytics unit 420 provides scalability, both in terms of the number of users as well as the amount of data in the database, such that a large number of users and a large quantity of data may be efficiently supported.

More specifically, the back-end analytics unit 420 is configured to process the pre-processed UDM transformed data 418 in a variety of ways in order to generate back-end analytics data 422. For example, the back-end analytics unit 420 may include sub-components/sub-routines configured to perform the following functions on the input data 418: query generation and optimization, computation, calculation, algorithms, aggregation, securitization, in-memory management and processing, predictive modeling, caching, data connecting, data clustering, alert generation, etc.

The analytical application unit 424 is configured to analyze and process the back-end analytics data 422 in order to generate multi-tenant analytics data 426. For example, the analytical application unit 424 may process the back-end analytics data 422 in order to create, save, and view analytical applications including analysis, reports and decision support processes, and flows. More specifically, the analytical application unit 424 may include sub-components/sub-routines configured to perform the following functions on the back-end analytics data 422: filtering, sorting, drill-down functionality, drill-through functionality, defining settings, pivoting, data slicing, providing templates, charting, formatting, exporting, prompting, date picking, grid generation, analysis and report creation, decision support flow, and/or searching capabilities. In one example, the analytical application unit 424 is operative to transform the back-end analytics data 422 from a state that is not meaningfully perceptible to humans (e.g., numeric data without any clear visual organization) into a state that is far more perceptible and recognizable to humans (e.g., by organizing and/or transforming the back-end analytics data 422 into a report or the like). In this manner, the analytical application unit 424 is configured to generate multi-tenant analytics data 426. In one example, the multi-tenant analytics data 426 is generated in response to client requests provided to the analytical application unit 424 via the analytics user interface 428 (discussed below). Importantly, in one embodiment of the system 400 illustrated in FIG. 4, the multi-tenant analytics data 426 is based on UDM transformed data 414 associated with at least two different data sources (e.g., different entities, different units within the same entity, etc.). In this manner, the multi-tenant analytics data 426 that is generated by the analytical application unit 424 takes into account data from at least two disparate data sources.

The analytics user interface 428 allows client(s) 432 to obtain (e.g., view) the generated multi-tenant analytics data 426 and issue client requests 430 to the multi-tenant analytics system 400. In one example, the analytics user interface 428 includes a graphical user interface, such as a web-page or the like, allowing client(s) 432 to interact with the multi-tenant analytics system 400 from remote locations, for example, over one or more suitable networks, such as one or more of the networks described above. The analytics user interface 428 may include tools (i.e., sub-components/sub-routines, widgets, etc.) that provide for filtering, sorting, formatting, charting, date picking, and/or grid generation.

Figure 5A:
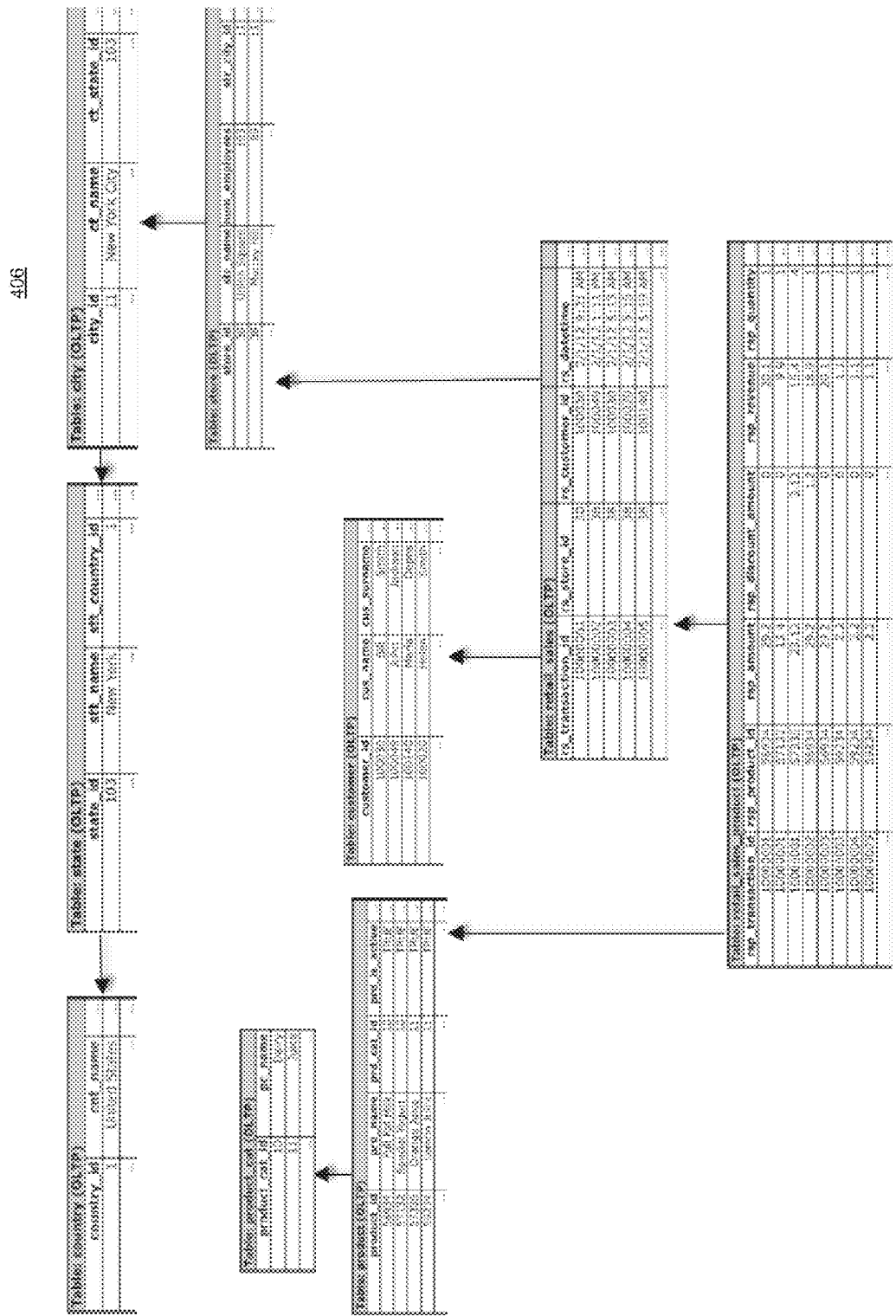
FIG. 5a illustrates exemplary raw data from one or more disparate data sources according to an embodiment of the present disclosure.

Referring now to FIG. 5a, one example of the raw data 406 described above is illustrated. The exemplary raw data 406 shown in FIG. 5a has not undergone integration processing (e.g., the processing performed by the integration unit 410 described above) and does not conform to the UDM construct 412.

Figure 5B:
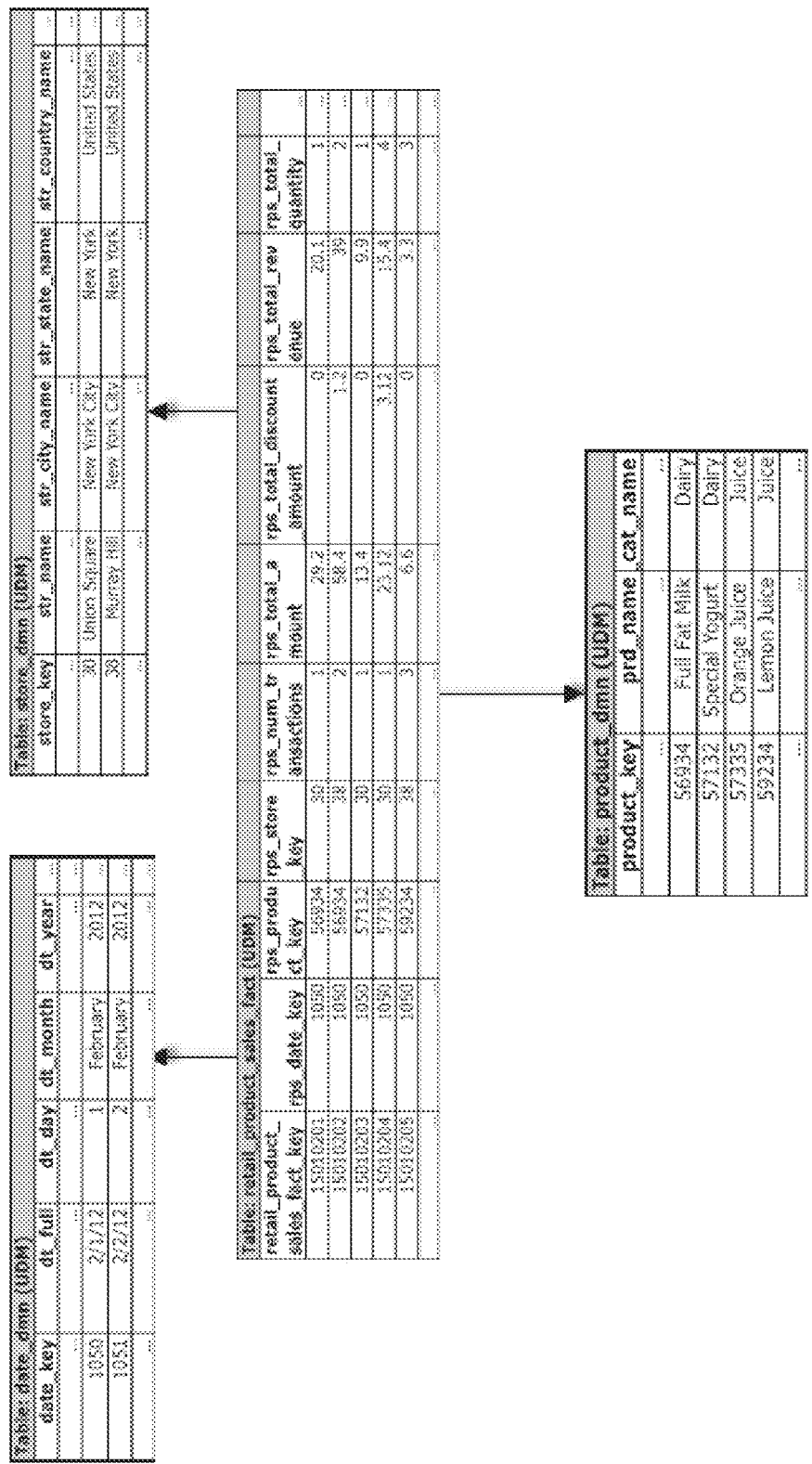
FIG. 5b illustrates exemplary UDM transformed data that has been transformed to conform to the UDM construct according to an embodiment of the present disclosure.

FIG. 5b illustrates the raw data 406 of FIG. 5a after it has undergone integration processing and after it has been conformed to the UDM construct 412. Stated another way, FIG. 5b illustrates one example of UDM transformed data 414. Those having ordinary skill in the art will appreciate that the transformation of the raw data 406 of FIG. 5a into the UDM transformed data 414 of FIG. 5b is merely exemplary in nature and is not intended to limit the present disclosure in any way. That is to say, the specific manner in which the raw data 406 is transformed will depend on particular circumstances and the data transformation shown in FIG. 5b is merely one example of the types of transformations that are contemplated by the present disclosure.

Figure 5C:
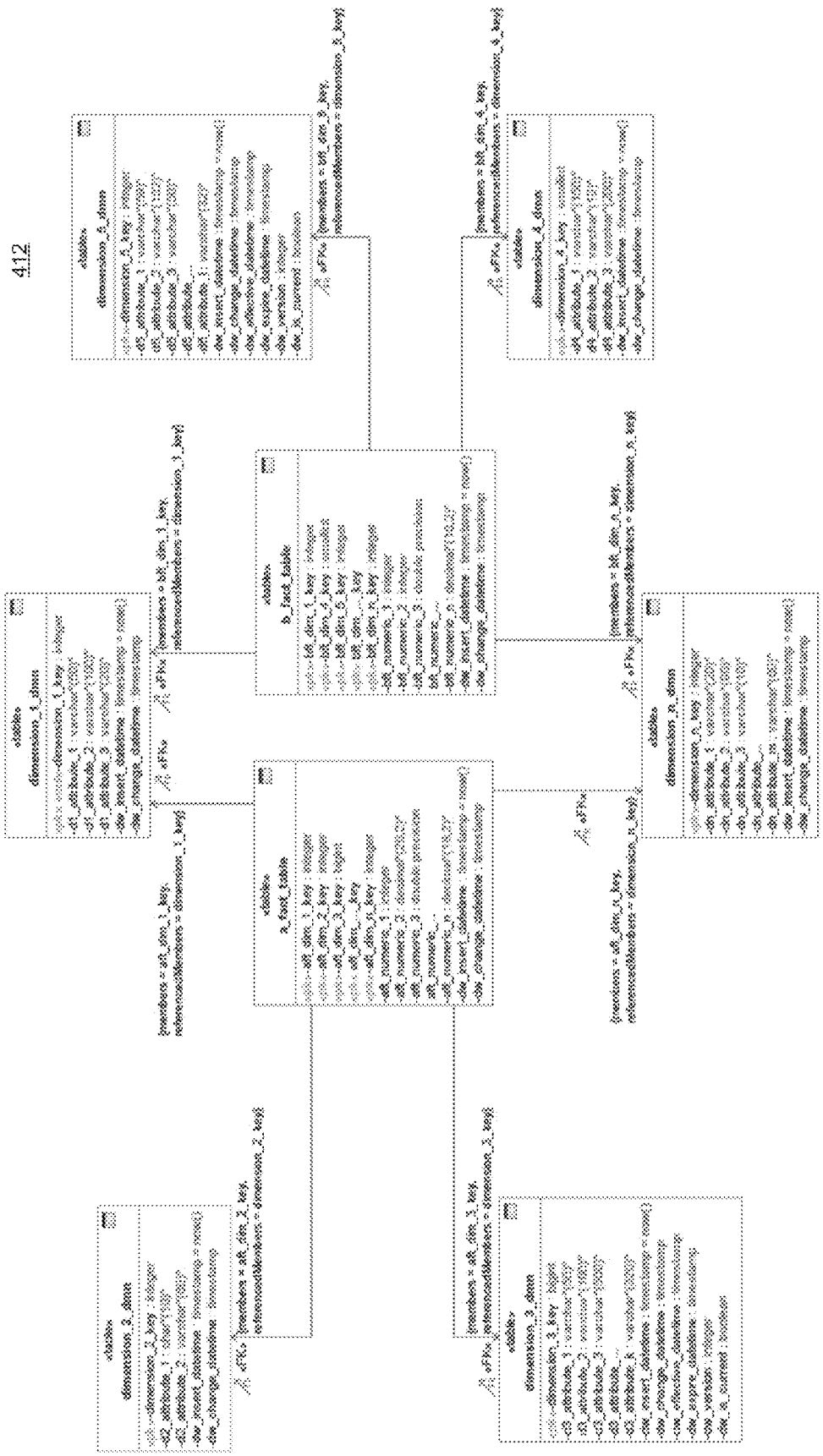
FIG. 5c illustrates an exemplary UDM construct according to an embodiment of the present disclosure.

FIG. 5c illustrates one example of a UDM construct 412 in accordance with the teachings of the present disclosure. Again, the particular structure/architecture of any given UDM construct 412 may changed based upon, for example, the structure of the raw data 406 that is input into the multi-tenant analytics system 400. Those having ordinary skill in the art will appreciate that the UDM construct 412 may take on any suitable number of different architectures as desired based upon factors such as the structure of the raw data 406 and or the application(s) of the system (i.e., the goal(s) of the multi-tenant analytics system 400 at any given time).

Figure 6:
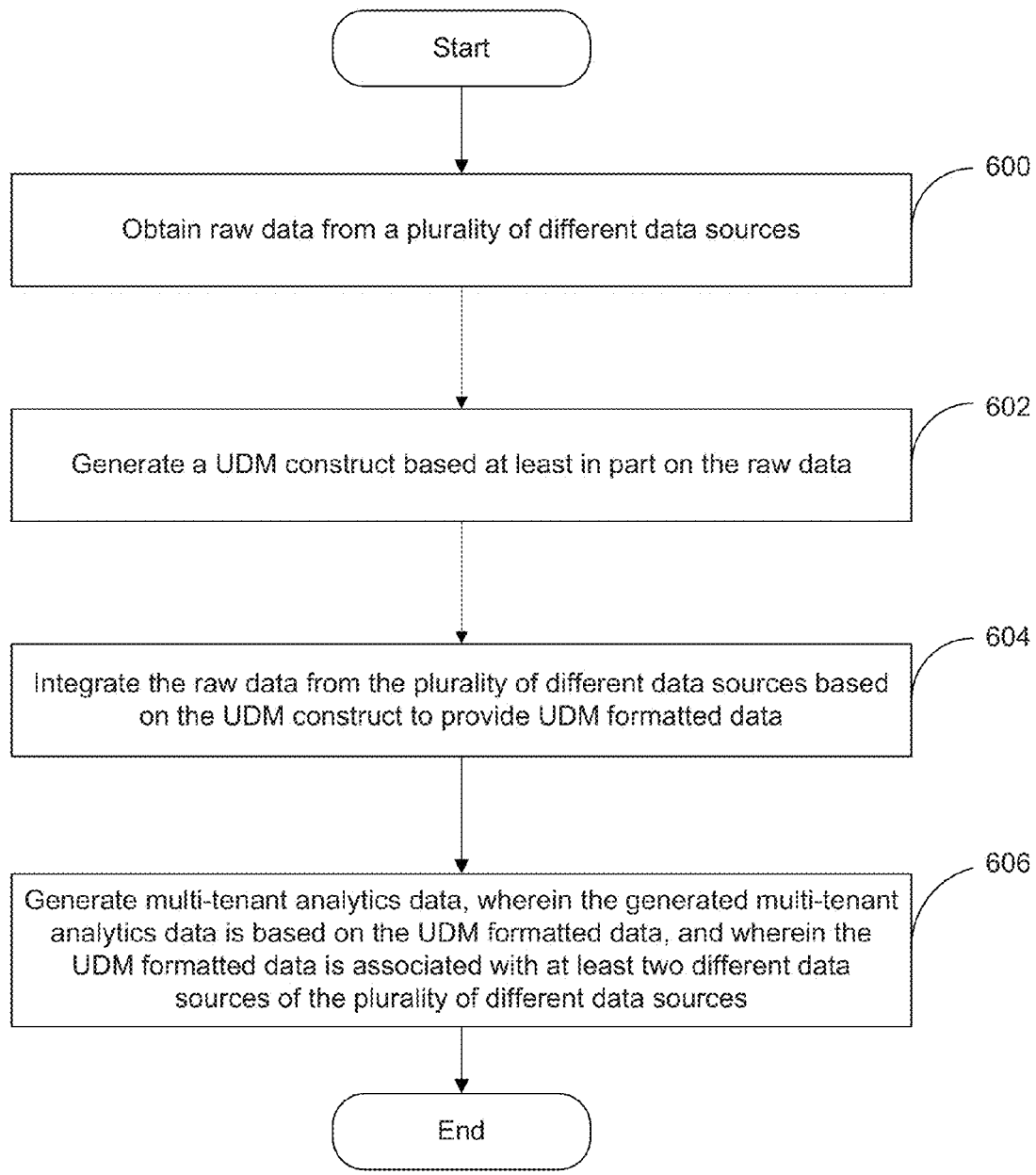
FIG. 6 is a flowchart illustrating a method for generating multi-tenant analytics data according to one or more embodiments of the present disclosure.

Referring now to FIG. 6, a flowchart illustrating a method of generating multi-tenant analytics data according to one embodiment of the disclosure is provided. The processing described in FIG. 6 may be implemented by one or more of the computing systems and/or processing units (possibly networked) described herein, although those having ordinary skill in the art will appreciate that other, functionally equivalent, techniques may also be employed. Furthermore, as known in the art, some or all of the functionalities implemented via executable instructions may also be implemented using firmware and/or hardware devices such as application specific integrated circuits (ASICs), programmable logic arrays, state machines, etc. Once again, those having ordinary skill in the art will appreciate the wide number of variations that may be used in this manner.

Beginning at step 600, raw data is obtained from a plurality of data sources. At step 602, a UDM construct is generated based, at least in part, on the raw data. At step 604, the raw data is integrated from the plurality of different data sources based on the UDM construct to generate/provide UDM transformed data. Finally, at step 606, multi-tenant analytics data is generated. The multi-tenant analytics data may be generated based on the UDM transformed data. In addition, the UDM transformed data may comprise data associated with at least two different data sources of the plurality of different data sources.

Illustrative Example

Retail

The foregoing features of the present disclosure can be more clearly appreciated in the context of this example, reflecting the data needs of two distinct entities: (i) FlowerCo and (ii) Buyerville.com. In this example, a marketing analyst at FlowerCo will login to the system and query the database for an optimized sale date based on its user profile on current data in the warehouse. The result is a proposed sale data of February 15—one day after St. Valentine's Day.

Buyersville.com, a general purpose retailer having an online different user profile, accesses the data in warehouse and receives "Dec. 27, 2011" as the optimized sale date for its profile—notwithstanding applications of the same data.

Illustrative Example

Finance

CreditCo.com wants to analyze how a competitors interest rate changes affect the likelihood of their customers switching over to one of their credit cards. The user would log into the knowledge network and buy data that would allow this analysis to be run. This would allow them to see which competing customers have changed their rates in the past and get a probability on customers that changed from one company to theirs in the past, what kind of customers those where, and what messages have worked in the past. The customer would also see the available message options and probabilities of their success.

Illustrative Example

Manufacturing

Manufacturer groups data with a group of friendly insurance companies to determine pricing elasticity for their products. Manufacturer would group data with the insurance companies to better price products that have high insurance rates. An insurance company user of the knowledge network would log in to see how new rate quotes on their products and competitors are affecting buyers desire to purchase their products. By using this data the system can recommend the optimal pricing adjustments to increase revenue or other key metrics.

Illustrative Example

Medical

MedicalCo wants to analyze where a customer is likely to go to a doctor with regards to medical conditions that are solved by a specific procedure like obesity. The MedicalCo wants to compare doctors who know their particular procedure and use their devices to population sets from census data to help focus training and sales on areas of highest success. The Medical analyst can log in to see visualizations of the overlaps and places where they should dispatch sales people. This data can populate CRM systems via an API automatically.

Illustrative Example

Automotive

AutoCo.com wants to better understand how gas prices, model types and color preferences on new model cars are affecting their sales. This might allow the company to better manage logistics and recommendations to dealers on what color and model cars to buy based on changing factors. AutoCo.com might want to make recommendations on their web site (drawn automatically from the knowledge network) when the dealer logs into their order systems.

Having described a number of different embodiments of the disclosure, it should be apparent to the person of ordinary skill that the disclosure has numerous benefits and advantages. For example, a knowledge network may be provided that allows users and organizations to tap into complex business analytics on disparate sources of data at a low cost.

Further, the ability to combine datasets amongst users and organizations enables a platform of multi-tenant knowledge network which actually gets smarter and more robust as it grows and gains additional stakeholders.

Because the systems and methods of the present disclosure allow for the robust segmentation, provision, and sharing of data across users, the present disclosure presents a new paradigm for business intelligence services that eliminates previous limits previously thought omnipresent. While much of the foregoing discussion has concentrated on applying the business intelligence system and/or multi-tenant analytics system to marketing applications, those having ordinary skill in the art will appreciate that the features described herein may be equally applied to any business or function, or even to non-business applications.

Other benefits and advantages of the systems and methods described herein will be apparent to the person of ordinary skill in the art.

Other embodiments and uses of the systems and methods described herein will be apparent to those having ordinary skill in the art upon consideration of the specification and practice of the systems and methods disclosed herein. The specification and examples given should be considered exemplary only, and it is contemplated that the appended claims will cover any other such embodiments or modifications as fall within the true scope of the disclosure.

What is claimed is:

1. A non-transitory computer-readable medium comprising executable instructions that when executed by a processor cause the processor to effectuate a method comprising the steps of:
   obtaining raw data from a plurality of different data sources, wherein the plurality of different data sources comprise a plurality of different business entities;
   analyzing the raw data to identify one or more data structures of the raw data;
   generating a plurality of Universal Data Model (UDM) constructs, each UDM construct based at least in part on the identified one or more data structures of the raw data;
   integrating the raw data from the plurality of different data sources by extracting, transforming, and loading the raw data such that the raw data conforms to the UDM construct for the identified one or more data structures of the raw data, wherein the integrating generates UDM transformed data; and
   generating multi-tenant analytics data, wherein the generated multi-tenant analytics data is based on the UDM transformed data, and wherein the UDM transformed data is associated with at least two different data sources of the plurality of different data sources.

2. The non-transitory computer-readable medium of claim 1, wherein the plurality of different business entities comprise a plurality of different units within a single business entity.

3. The non-transitory computer-readable medium of claim 1, wherein obtaining raw data from a plurality of different data sources is performed by a data mining engine.

4. The non-transitory computer-readable medium of claim 1, wherein obtaining raw data from a plurality of different data sources is performed substantially contemporaneously.

5. The non-transitory computer-readable medium of claim 1, wherein the UDM constructs are based on a universal taxonomy.

6. The non-transitory computer-readable medium of claim 1, wherein integrating the raw data from the plurality of different data sources further comprises normalizing the data.

7. The non-transitory computer-readable medium of claim 1, wherein the plurality of different data sources further comprises one or more non-business entities.

8. The non-transitory computer-readable medium of claim 7, wherein at least one of the one or more non-business entities is a government entity.

9. The non-transitory computer-readable medium of claim 1, wherein characteristics identifying at least one of the plurality of different data sources are excluded from the UDM transformed data.

10. The non-transitory computer-readable medium of claim 9, wherein the characteristics to be excluded from the UDM transformed data are determined based on the one or more data structures of the raw data.

11. The non-transitory computer-readable medium of claim 1, wherein the method further comprises negotiating with at least one of the plurality of different data sources to obtain raw data.

12. The non-transitory computer-readable medium of claim 1, wherein the method further comprises purchasing raw data from at least one of the plurality of different data sources.

* * * * *